United States Patent

Kaneda et al.

[11] Patent Number: 5,281,796
[45] Date of Patent: Jan. 25, 1994

[54] LENS UNIT WHEREIN FOCAL LENS MOVEMENT IS SELECTIVELY INHIBITED DURING ZOOMING

[75] Inventors: Naoya Kaneda, Chigasaki; Masahide Hirasawa, Sagamihara; Kunihiko Yamada, Tokyo; Kitahiro Kaneda; Mitsuo Niida, both of Yokohama, all of Japan

[73] Assignee: Canon Kabushiki Kaisha, Tokyo, Japan

[21] Appl. No.: 820,553

[22] Filed: Jan. 14, 1992

[30] Foreign Application Priority Data

Jan. 16, 1991 [JP] Japan .................................. 3-3321

[51] Int. Cl.$^5$ ............................ G01J 1/20; G03B 3/00
[52] U.S. Cl. ................................. 250/201.2; 359/698; 354/402
[58] Field of Search .... 250/201.2, 201.4, 201.6–201.8; 359/696–698; 354/402

[56] References Cited

U.S. PATENT DOCUMENTS

| | | | |
|---|---|---|---|
| 4,697,891 | 10/1987 | Kawai | 359/696 |
| 4,735,494 | 4/1988 | Makino et al. | 359/698 |
| 4,881,799 | 11/1989 | Ohno et al. | 359/698 |
| 4,976,523 | 12/1990 | Ishikawa | 359/696 |
| 5,060,001 | 10/1991 | Kaneda | 359/698 |
| 5,067,802 | 11/1991 | Orino | 359/698 |

FOREIGN PATENT DOCUMENTS

| | | | |
|---|---|---|---|
| 0733319 | 3/1990 | Japan | 359/698 |
| 0027011 | 2/1991 | Japan | 359/698 |

Primary Examiner—Michael Messinger
Attorney, Agent, or Firm—Robin, Blecker, Daley & Driscoll

[57] ABSTRACT

An optical equipment comprises: a first lens for focusing and compensation for magnification variation; a second lens for magnification variation; position detection means for detecting positions of the first lens and the second lens; focus detection means for detecting a focus status; lens drive means for driving the first lens and the second lens; and control means for controlling the lens drive means in accordance with information from the position detection means and the focus detection means. The control means determines a drive range of the first lens in which a circle of confusion may be zero, in accordance with focal length information, and inhibits the first lens from being driven out of the range during the magnification variation of the second lens.

10 Claims, 9 Drawing Sheets

LENS UNIT WHEREIN FOCAL LENS MOVEMENT IS SELECTIVELY INHIBITED DURING ZOOMING

BACKGROUND OF THE INVENTION

1. Field of the Invention

The present invention relates to an optical equipment such as a video camera, a still camera and a lens barrel having a lens control unit for controlling a lens position.

2. Related Background Art

Various types of lenses have been used in a zoom lens used for a video camera. FIG. 8 shows a common zoom lens. Numeral 1 denotes a front lens group which is movable along an optical axis for focusing, numeral 2 denotes a variator lens group which varies magnification, and numeral 3 denotes a compensator lens group for maintaining a focus plane constant when the magnification is varied. The variator 2 and the compensator 3 are moved for varying the magnification while they are kept in a predetermined relationship. Numeral 4 denotes a focusing lens group, and numeral 5 denotes a focus plane on which a CCD is mounted. In a front focus lens shown in FIG. 8 in which the focusing is done by the front lens 1, a mechanical cam ring is usually used to keep a fixed relationship between the variator 2 and the compensator 3.

On the other hand, an inner focus or rear focus lens in which the focusing is done by a lens group behind the variator lens rather than by the front focus lens is also known.

In a rear focus zoom lens shown in FIG. 9, the front lens group is fixed while the variator 2 and the compensator 3 are moved in linkage by a mechanical cam ring as they are in the front focus lens of FIG. 8. A lens group 4 or a portion thereof functions as a focusing lens. Where the focusing lens group is located behind the variator lens, it is necessary to move the lens group 4 during zooming even if a distance to an object remains unchanged. Further, a position of the lens group 4 to comply with a focal length varies with the distance to the object. FIG. 10 shows an in-focus position in accordance with a distance to an object for various focal lengths of the lens group 4. An abscissa represents the focal length, W represents a wide end and T represents a telescope end. An ordinate denotes a position of the lens group 4 and curves 6-10 shown in-focus positions for a given distance. For example, curve 6 represents 50 cm, curve 7 represents 1 meter, curve 8 represents 2 meters, curve 9 represents 10 meters and curve 10 represents infinite.

Where the lens group 4 is driven out (toward the object) to the wide end at a point 11, the focusing to a very near object is attained.

Another construction of inner focus lens is shown in FIG. 11. The lens group 1, the variator 2 and the iris 12 are moved during the magnification variation. Numeral 4A denotes a fixed lens group and numeral 4B denotes a focusing lens group.

Since there is no compensation lens group (the compensator in FIG. 3) behind the variator 2, which is moved in the predetermined relationship to the variator 2, the graph shown in FIG. 10 changes to the one shown in FIG. 12. For example, curve 13 represents 50 cm, curve 14 represents 1 meter, curve 15 represents 2 meters, curve 16 represents 10 meters and curve 17 represents infinite.

In the inner focus lens or the rear focus lens, it can focus to a very near object compared to the front focus lens and a compact lens structure is attained depending on a type of lens. On the other hand, in order to prevent defocusing in zooming even if the distance to the object does not change, the relationship as shown in FIGS. 13 or 12 should be exactly maintained.

The following methods have been proposed to avoid such defocusing.

First, a combination with a TTL auto-focusing device is pointed out. For example, in a video camera auto-focusing device, a peak of a high frequency component of an image pickup signal of a CCD is used to indicate an in-focus position.

FIG. 13 shows a principle thereof. An abscissa represents a position of a focusing lens group and an ordinate represents a high frequency component (focusing voltage) of an image pickup signal. The focusing voltage is maximum at a position shown by an arrow, and the position A is an in-focus position of the lens. A front focus or a rear focus in the defocus status is determined by whether it is on the left side or the right side of the point A.

Several methods to determine the front focus and the rear focus have been known.

In a first method, the focusing lens group is moved to one of the two directions and a change in the focusing voltage caused thereby is detected.

In a second method, an image pickup device is slightly vibrated by a piezo-electric actuator to detect a phase relationship of a change in the focusing voltage.

In a third method, the focusing lens group itself is slightly vibrated in a similar manner to that of the second method. It is usually carried out in the inner focus lens by using a stepping motor.

In the inner focus lens, when the lens is zoomed from the in-focus position at the wide end to the telescope end, the lens may follow a distance locus in the positional relation between the focal length and the focusing lens group as shown in FIGS. 10 and 12. However, when a focus depth is taken into consideration, it is not possible to exactly predict from an absolute position of the focusing lens group which is at the in-focus position in the wide end to the in-focus position in the telescope end.

Accordingly, when the lens is zoomed from the wide end to the telescope end, it is essential to always operate the auto-focusing device to maintain the in-focus state based on the detection by the auto-focusing device.

When the first to third methods are to be applied to the zooming of the inner focus lens from the wide end to the telescope end, the second method which uses the actuator such as a piezo-electric actuator separately from the actuator for driving the focusing lens group and vibrates the image pickup device other than the focusing lens group is not disadvantageous to the inner focus lens and the direction can be detected, but it is inadvantageous in terms of cost and size.

On the other hand, the first and third methods need the actuator to drive the focusing lens group in order to follow the locus shown in FIGS. 10 or 12. It is necessary to superimpose the drive for detecting the direction on the following operation.

In this case, there is no problem in terms of cost and size but a specification required for the actuator is severe. Accordingly, when it is spaced from the in-focus point in the map shown in FIGS. 10 or 12, the "follow" information is no longer the information of locus which passes through the in-focus point. As a result, the ability to detect the direction is lowered.

SUMMARY OF THE INVENTION

It is an object of the present invention to provide an optical equipment having a lens position control unit for an inner focus zoom lens which controls lens drive means for driving a focusing lens group and a variator lens group during variation of magnification while focusing means detects an in-focus state and position detection means detects the positions of the lens groups, in which when the focusing means detects the in-focus state, the control means receives an F number as input information and determines a range of position of the focusing lens group in which a circle of confusion may be zero, and inhibits the focusing lens group from moving out of the position range during the variation of magnification so that the defocusing during zooming is minimized.

DETAILED DESCRIPTION OF THE PREFERRED EMBODIMENTS

FIGS. 1 to 3A and 3B illustrate basic concept of the present invention.

Figure 1:
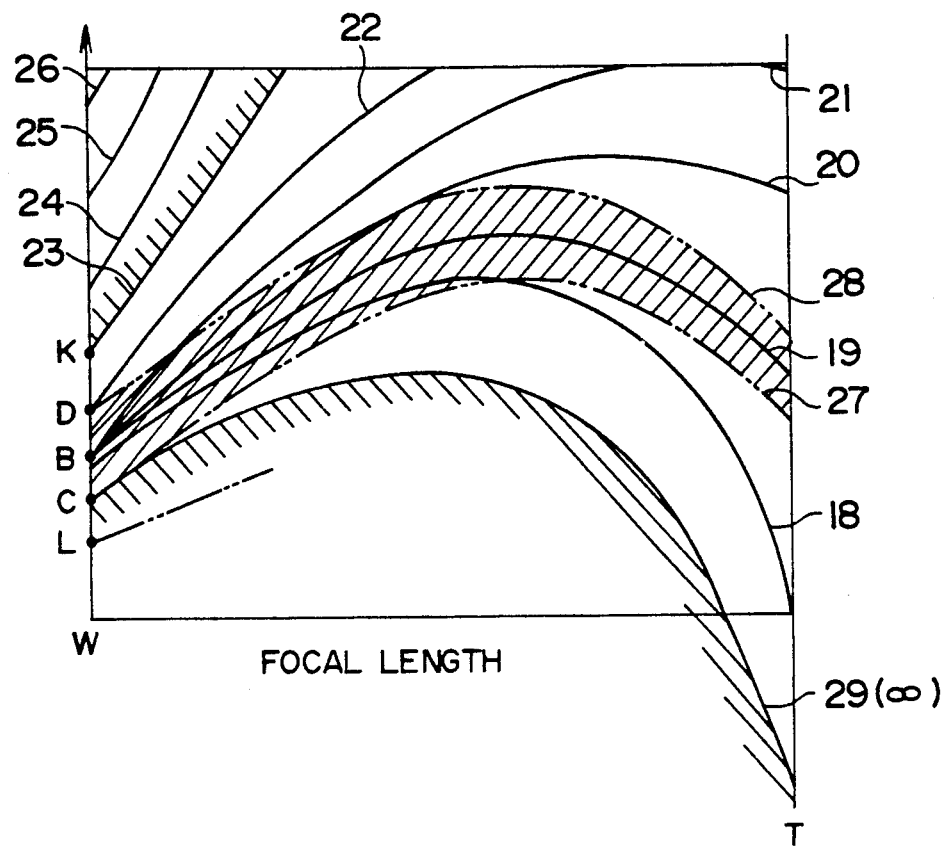
FIG. 1 shows a principle of the present invention.
Figure 12:
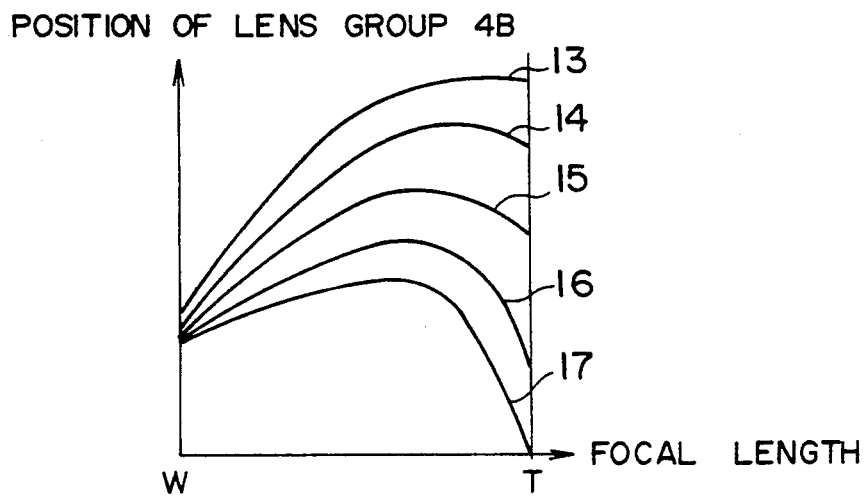
FIG. 12 shows an in-focus locus in the lens shown in FIG. 11.

FIG. 1 shows a map similar to that shown in FIG. 12. A curve 29 shows a locus of an in-focus point for infinite distance, and curves 18-26 show loci of in-focus points for various distances to an object. The distance to the object increases in the order of 18-26.

It is now assumed that the object is at the distance corresponding to the in-focus locus shown by 19. In the case of an ordinary inner focus lens, a sensitivity a of the focusing lens group (a shift of a focus position when the focusing lens group is moved by a unit of length) is substantially constant without regard to the focal length.

The in-focus range is from the point on the locus 19 (in-focus point) to a point spaced by $x = S \cdot F/a$ (vertical position in the map) for the given focal length, where F is a current apperture number, a is the sensitivity and S is a permissible circle of confusion.

In FIG. 1, a hatched area enclosed by the curves 27 and 28 is the in-focus range. The defocusing does not occur during the zooming if the relationship between the focal length and the position of the focusing lens group is within the hatched area.

Assuming that the point B is the in-focus point at the wide end, the range C-D is the in-focus range. Accordingly, the auto-focusing device need not have a precision to precisely stop at the point B but it may stop in the range C-D.

However, when the in-focus state is attained at the point D, the locus 22 which passes through the point D is a far near in-focus locus compared to the correct locus 19. On the other hand, when the in-focus state is attained at the point C, the locus 29 which passes through the point C is an infinite locus.

As a result, if the zooming is done to simply follow the locus which passes through the in-focus point at the wide end, the in-focus state is not always maintained during the zooming from the wide end to the telescope end. Such defocusing during the zooming may be corrected by the auto-focusing device, but the focusing lens group can be moved during the zooming to minimize the defocusing by defining an "out-of-focus area" in the map based on the initial position of the focusing lens group and the aperture number thereof and controlling the position of the focusing lens group so that it is not positioned in the out-of-focus area.

The movable range of the focusing lens group may be limited by defining the out-of-focus area. The current absolute position of the focusing lens group, focal length and F number at the in-focus position are detected, and an in-focus area is defined by assuming that the absolute position of the focusing lens group is at the rear focus end and the front focus end in a stop position area which is determined by the ability to detect the circle of confusion, of the auto-focusing device, the focal length (sensitivity) and the F number. This area is called a "possible in-focus area".

The nearest end and the farthest end of the possible in-focus area are the ends of the in-focus area which are known from the current status. Accordingly, even if the auto-focusing device is disabled to detect the direction during the zooming, the defocusing may be avoided by limiting the movement of the lens in the possible in-focus area determined when the lens was at the in-focus point.

In FIG. 1, it is assumed that the lens is stopped at the point B which is the in-focus point at the wide end. In this case, if the point B is the rear focus end point, the point D is an exact in-focus point and the area B-K is the in-focus area.

If the point B is the front focus end point, the point C is the exact in-focus point and the area L-B is the in-focus area.

Thus, the area L-K is the possible in-focus area calculated at the wide end. In actual, the locus 29 which passes through the point C is the infinite in-focus locus and the point L is far infinite. Thus the area enclosed by the loci 29 and 23 is the possible in-focus area when the lens is zoomed.

Figure 2:
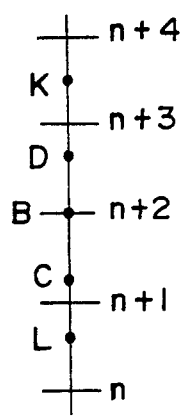
FIG. 2 shows an enlarged view of an ordinate at a wide end.

FIG. 2 shows an enlarged view of the stop point at the wide end. When a stepping motor is used as an actuator for driving the focusing lens group, the lens can be stopped only at points n, n+1 - n+4. Accordingly, when the loci 23 and 29 of FIG. 1 are stored in a memory by the number of steps n, n+1, - - -, the possible in-focus area C - K is represented by n+1 - n+4.

The possible in-focus area is calculated at every point in the zooming from the wide end to the telescope end by the detection of the in-focus state by the auto-focusing device to attain the "drive-in to the area".

The "drive-in to the area" is explained with reference to FIGS. 3A and 3B.

Assuming that the in-focus point is on the locus 30, the area enclosed by the curves 31 and 32 is the area in which the in-focus state can be maintained. Assuming that the focusing lens group is at the point E at the wide end, the possible in-focus area at the wide end is the area H - G, and the focusing lens group is inhibited from moving out of the area enclosed by the loci 33 and 34 during the zooming.

Figure 3A:
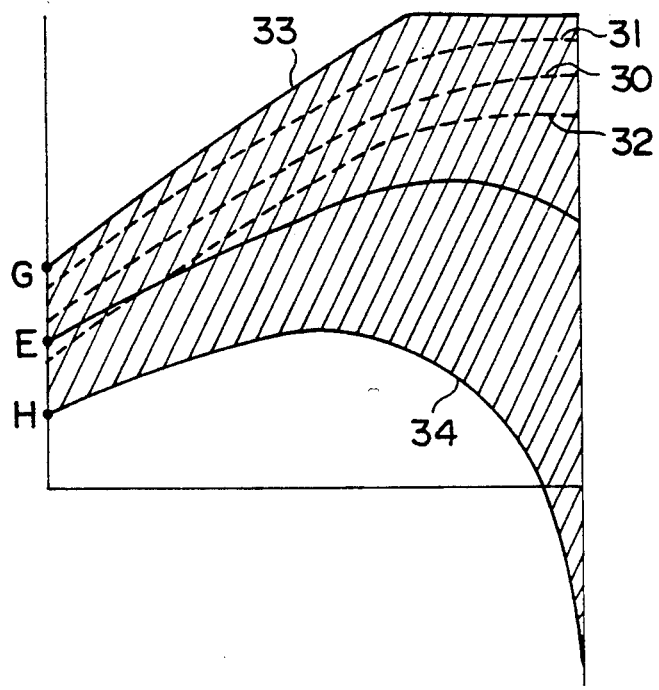
FIGS. 3A and 3B illustrates a "drive-in to area" control in the principle of control of the present invention.
Figure 3B:
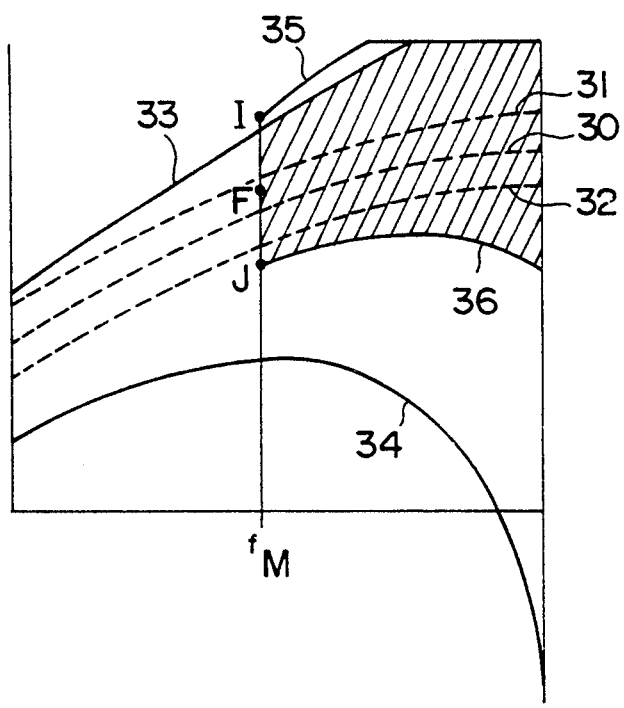

It is assumed that when the zooming is done from the position of FIG. 3A (wide end) to the telescope end, the in-focus state is attained at the point F with the focal length $f_M$ as shown in FIG. 3B. The possible in-focus area is defined for the point F by the area enclosed by the loci 36 and 35 which pass through the points J and I. Since the locus 35 is nearer than the near-side locus 33 defined in FIG. 3A, the locus 33, not the locus 35, may be used as the near-side end of the area. Accordingly, the hatched area in FIG. 3B is the possible in-focus area.

By combining the determination at the wide end shown in FIG. 3A and the determination at the focal length $f_M$ in the course of zooming shown in FIG. 3B, the near-side end can be driven into the locus 33 and not the locus 35.

Figure 5:
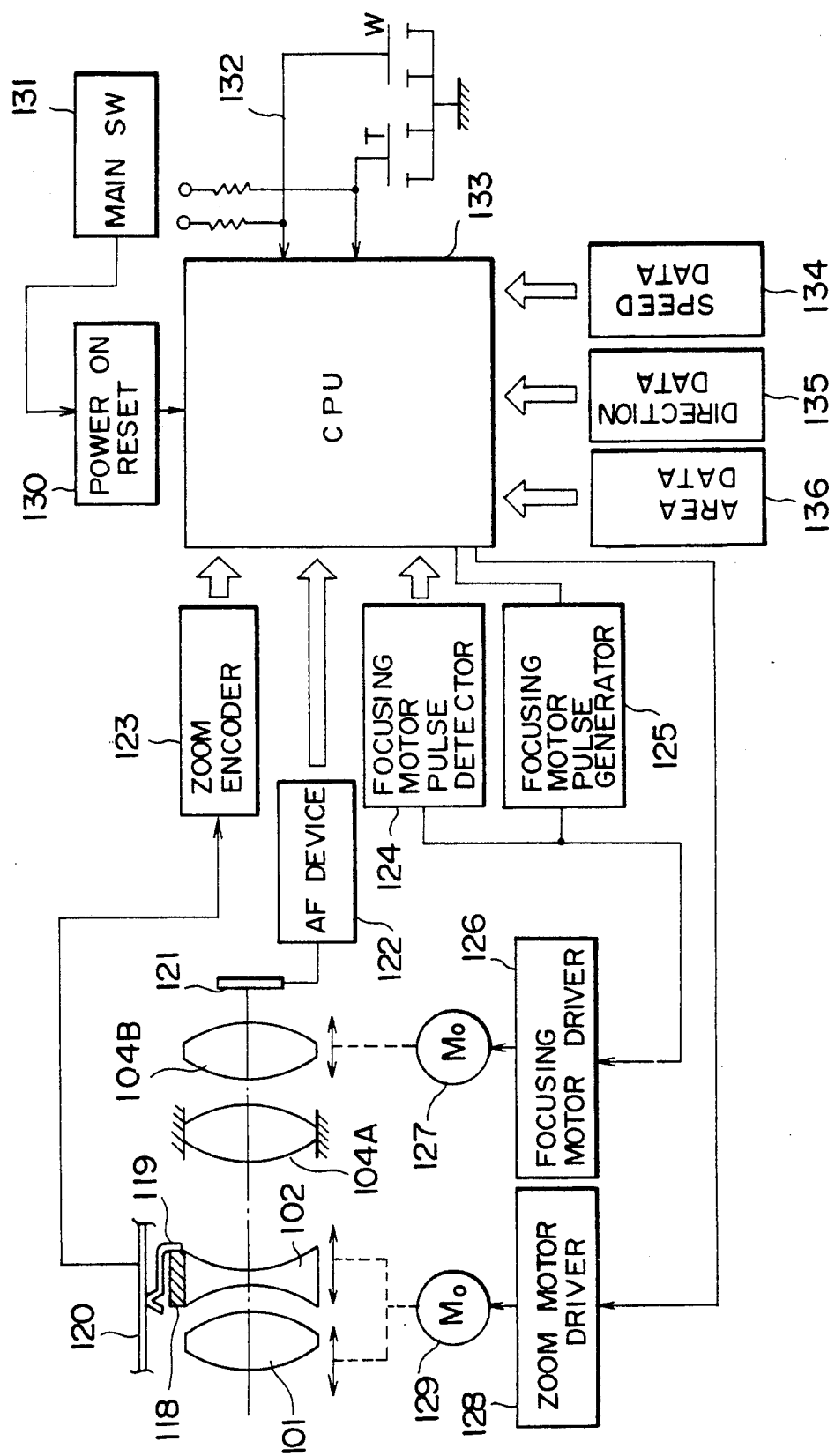
FIG. 5 shows a block diagram of the first embodiment.

FIG. 5 shows a block diagram of a first embodiment of the optical equipment having the lens position control unit in accordance with the present invention.

Figure 4:
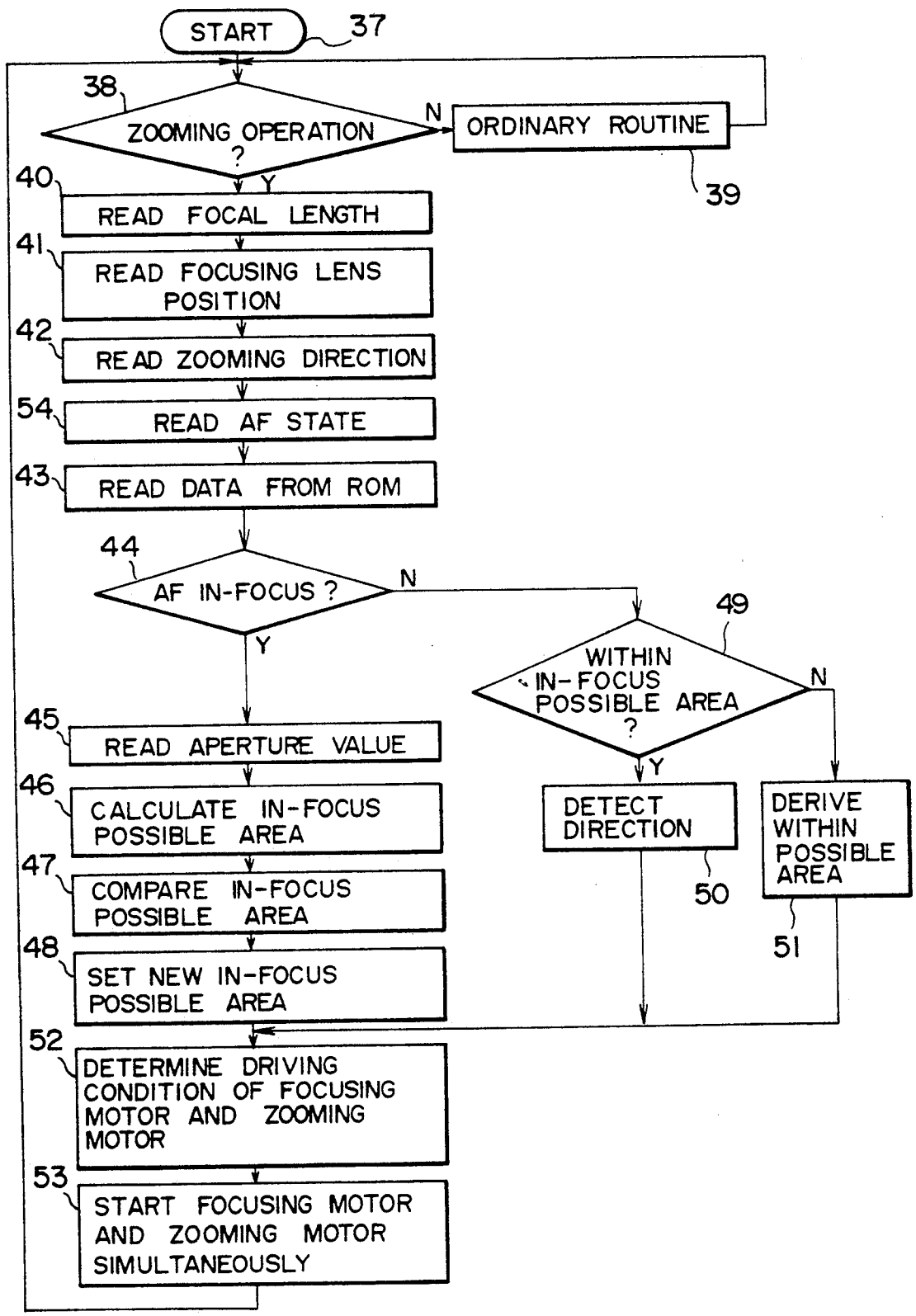
FIG. 4 shows a flow chart of a first embodiment.

Numerals 101 and 102 denote lens groups which are driven in the zooming by a zoom motor 129 through a zoom motor driver 128 in accordance with a drive signal determined by a flow of a CPU 133 shown in FIG. 4.

In the present embodiment, a brush 119 is integrally formed with a barrel 118 of a lens 102 to detect the focal length, and the brush 119 slides on a resistor or a Gray code pattern printed on a substrate 120. The detection output from the resistor is A/D converted by a zoom encoder 123 to produce absolute position information, which is read by the CPU 133.

Numeral 104A denotes a fixed lens group and numeral 104B denotes a focusing lens group. A stepping motor 127 is driven by a command from the CPU 133 through a focusing motor drive pulse generator 125 and a focusing motor driver 126. An absolute position of the focusing lens is detected by a pulse detector 124. Numeral 121 denotes an image pick-up device such as a CCD and numeral 122 denotes an AF device.

Three data 134–136 represent the loci in the map. The speed data 134 represents a speed at which the focusing lens is to be driven during the zooming at a constant zoom speed, based on the focal length and the focusing lens position, the direction data 135 represents a direction of rotation, and the area data 136 represents blocks in the memory in which the speed data and the direction data are to be stored. In addition to those data, the loci may be stored with addresses.

Numeral 131 denotes a main switch of a cam coder. When the absolute position of the focusing lens is detected by the number of pulses of the stepping motor, the lens 104B is driven to a position at which a switch (not shown) is turned on by a power-on reset circuit 130, and the position at which the switch is turned on is used as a start point for the step count.

When the inner focus lens is zoomed from the wide end to the telescope end, the CPU 133 calculates the possible in-focus range from the F number and the sensitivity and drives in the lens to that area to prevent the focusing lens from being driven out of the in-focus area at every focal length during the zooming. This operation is explained with reference to a flow chart of FIG. 4.

The process is started in a step 37. In a step 38, whether the zoom switch has been activated or not is checked. If it has not been actuated, a normal AF operation is carried out in a step 39.

If the zoom switch is actuated, the focal length and the position of the focusing lens group 104 are detected in steps 40 and 41. In a step 42, whether the zooming direction is from the wide end to the telescope end or from the telescope end to the wide end is checked. Based on the data of the steps 40–42, data to determine the directions and the speeds of the zoom motor and the focus motor are read from a ROM in a step 43. In a step 54, whether the AF is in the in-focus state, the front focus state, the rear focus state or the out-of-focus state with unknown direction is checked. If there is no limitation of the lens drive area by the possible in-focus area calculated by the present invention, the drive contents of the motors are determined in a step 52 following to the step 43, and the motors are simultaneously started in a step 53.

In the present embodiment, after the step 43, the in-focus state and the out-of-focus state are discriminated in a step 44 based on the result of AF read in the step 54. If it is the in-focus state, the F number is read in a step 45, the possible in-focus area is calculated in a step 46, it is compared with the past data in a step 47, and the possible in-focus area determined after the drive-in is set in a step 48.

When the out-of-focus state is detected in the step 44, whether it is in the area set in the step 48 or not is determined in a step 49. If it is not in the area, velocities to the focus and zoom motors are set in a step 51 to forcibly pull it back into the area. If it is in the area, a velocity is set in a step 50 to detect the direction.

In this manner, the drive directions and speeds of the focus motor and the zoom motor are finally determined in a step 52.

Figure 6:
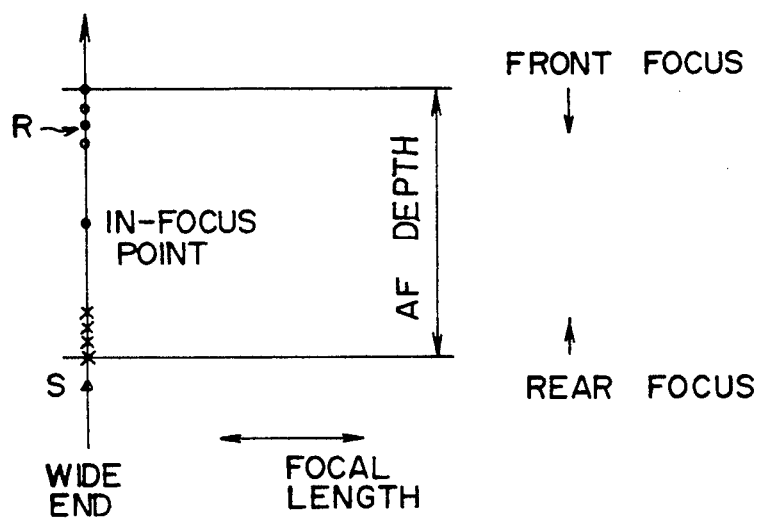
FIG. 6 shows a basic principle of control of a second embodiment.
Figure 7:
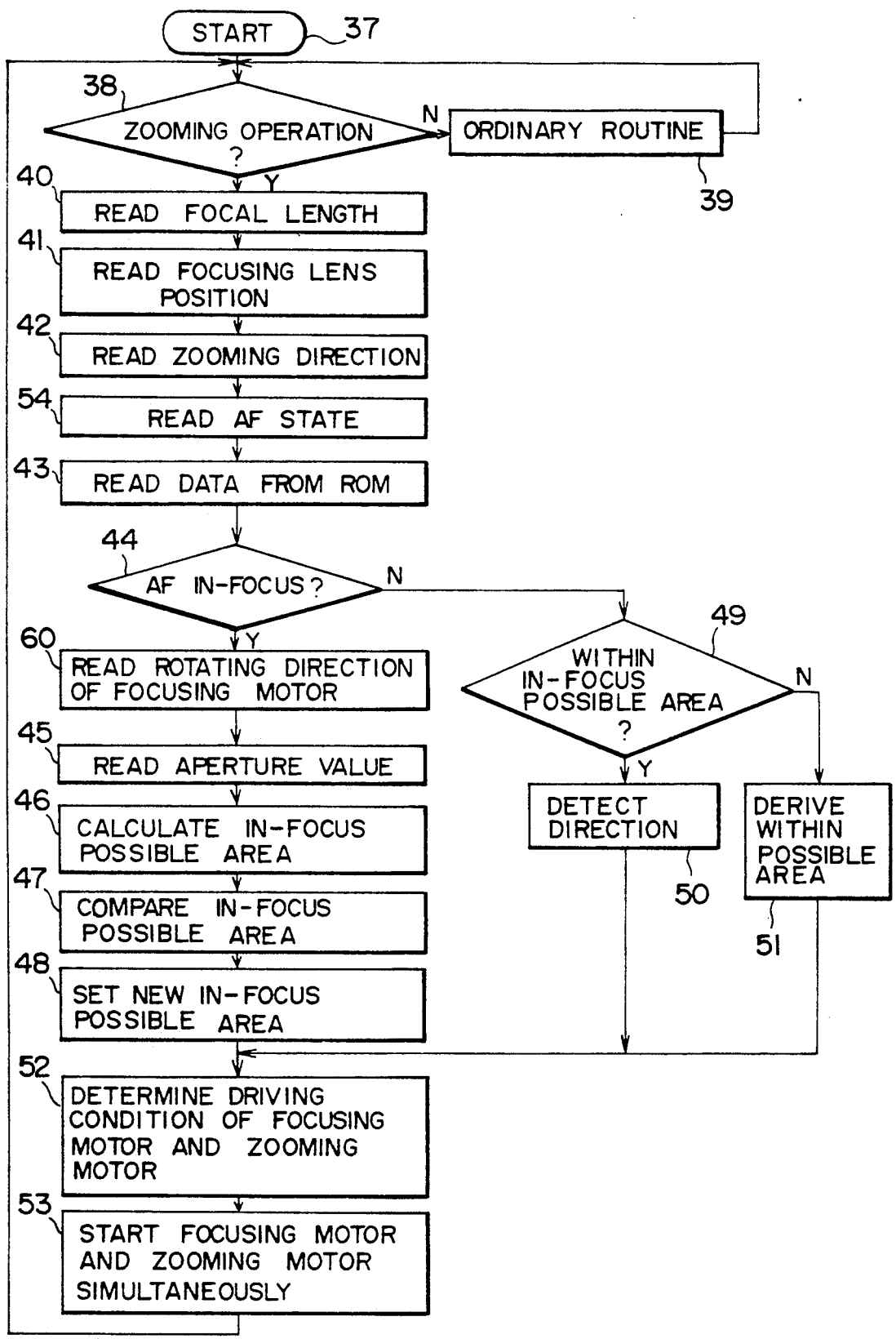
FIG. 7 shows a flow chart of the second embodiment.
Figure 8:
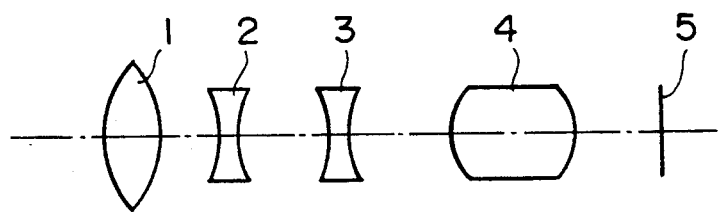
FIG. 8 shows a construction of a front focus zoom lens.
Figure 9:
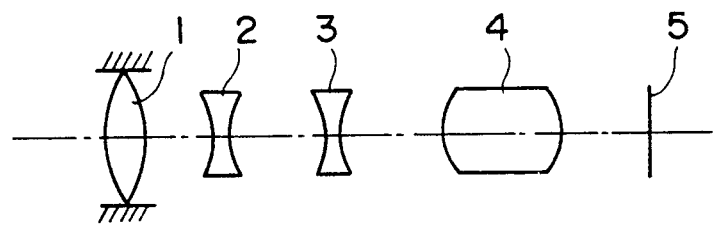
FIG. 9 shows a construction of an inner focus zoom lens.
Figure 10:
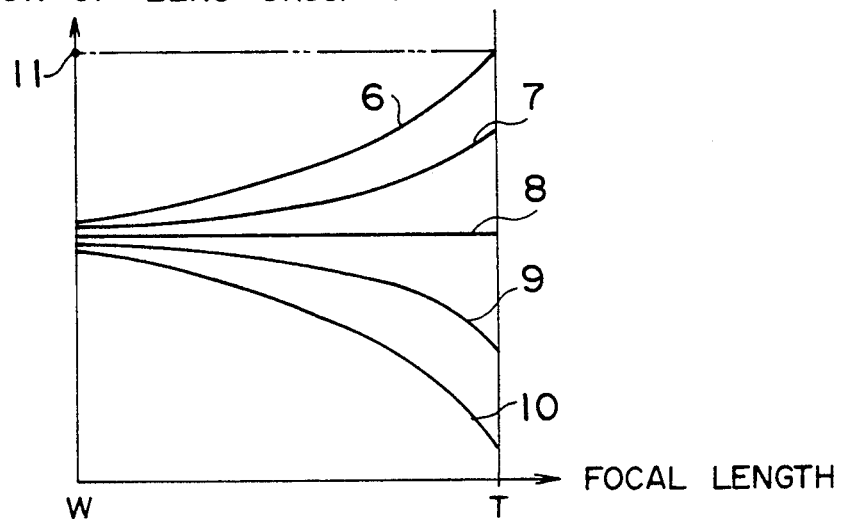
FIG. 10 shows an in-focus locus in the zoom lens of FIG. 9.
Figure 11:
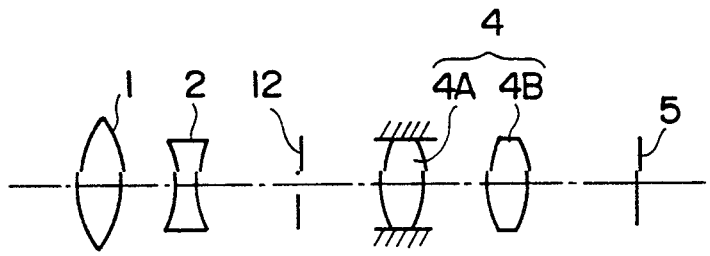
FIG. 11 shows another construction of inner focus zoom lens.

FIGS. 6 and 7 show a second embodiment.

In the present embodiment, whether the in-focus state was attained from the front focus state or the rear focus state is determined before the zooming is started in order to improve the precision of the initial possible in-focus area. The configuration is same as that of FIG. 5.

FIG. 6 shows a stop position of the focusing lens when the in-focus state is attained at the wide end. The point shown by "." is a real in-focus point but no defocusing takes place so long as the lens is stopped within the focus depth. When the in-focus state is attained from the front focus state, the lens is usually stopped near a position "0", and when the in-focus state is attained from the rear focus state, the lens is usually stopped near a point "X".

In the first embodiment, the possible in-focus area is set on the both assumptions that the in-focus point is on the rear focus side and that the in-focus point is on the front focus side. In the present embodiment, only one assumption is used because the direction to attain the in-focus state is detected. For example, if the in-focus state is attained at the point R in FIG. 6 from the front focus state, the point R is not assumed as the rear focus end but is assumed as the front focus end, and the area S-R is defined as the possible in-focus area. Thus, the area can be limited to one half of that of the first embodiment.

FIG. 7 shows a flow chart of the second embodiment. It is basically the same as the flow chart shown in FIG. 4, but when the in-focus state is detected in the step 44, the direction of drive of the focusing lens to the in-focus position is determined in a step 60. The direction of drive immediately before the in-focus state is attained may not be correct information because the motor is driven back and forth near the in-focus point. Thus, it is determined from a difference of the in-focus points between n continuous detections of the out-of-focus state in the same defocusing direction (rear focus or front focus) by the auto-focusing device and the in-focus state.

In a step 46, the possible in-focus area is calculated with a higher precision than that of the first embodiment by using the information read in the step 60.

Figure 13:
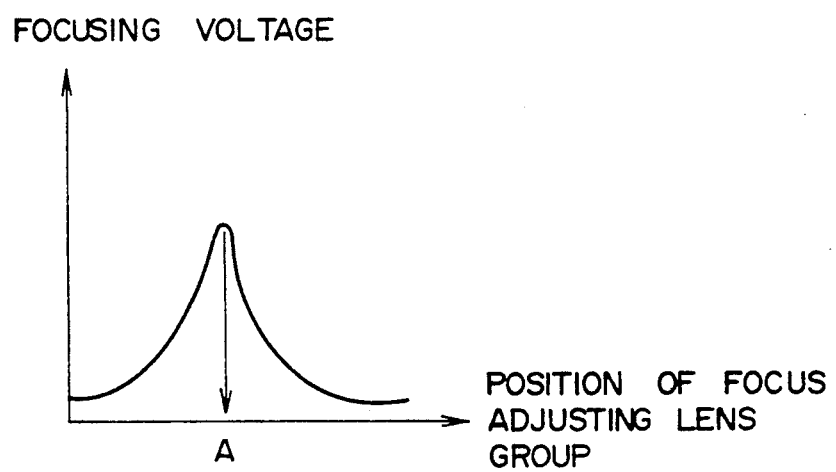
FIG. 13 shows a principle of an auto-focusing unit.

In the second embodiment, the possible in-focus area is calculated with the higher precision than that of the first embodiment based on the direction of rotation of the focus motor (that is, the direction of drive of the focusing lens) when the in-focus state is attained. In order to further improve the detection ability, the change in the ability of the auto-focusing device by the magnitude of the focusing voltage shown in FIG. 13 when the in-focus state is attained and other object conditions (such as brightness) may be taken into consideration.

In FIG. 6, the ability of the auto-focusing device is represented by the circle of confusion (value within the circle of confusion), and when it is called "depth of AF", the stop position of the focusing lens which is farthest from the real in-focus position while a variation is taken into consideration coincides with the "depth of AF". Namely, the "depth of AF" changes only with the F number and the possible in-focus area is automatically determined. If the "depth of AF" changes narrowly by the object condition, the possible in-focus area can be further narrowed by reading the change.

In accordance with the present embodiment, when the inner focus zoom lens is zoomed by the lens AF system which is combined with the auto-focusing device which utilizes the image pickup signal, the possible in-focus area is calculated at the in-focus state, and the values calculated for the respective focal lengths are compared to set the narrowest possible in-focus area. In this manner, the occurrence of the defocusing during the zooming is significantly suppressed.

What is claimed is:

1. An optical equipment comprising:
   (a) a first lens for focusing and compensation for magnification variation;
   (b) a second lens for magnification variation;
   (c) position detection means for detecting positions of said first lens and said second lens;
   (d) focus detection means for detecting a focus status;
   (e) lens drive means for driving said first lens and said second lens; and
   (f) control means for controlling said lens drive means in accordance with information from said position detection means and said focus detection means;
   said control means determining a drive range of said first lens in which a circle of confusion may be zero, in accordance with focal length information, and inhibiting said first lens from being driven out of said range during the magnification variation of said second lens.

2. An optical equipment according to claim 1, wherein said control means determines the circle of confusion based on aperture numbers of an optical system including said first lens and said second lens.

3. An optical equipment according to claim 1, wherein said control means monitors the range of said first lens in which the circle of confusion may be zero during the movement of said second lens and selects the narrowest range of calculated ranges.

4. An optical equipment according to claim 1, wherein said control means read drive information to maintain said first lens in the in-focus state from memory means when said second lens is moved.

5. An optical equipment according to claim 4, wherein said control means connects the drive information of said first lens read from said memory means in accordance with the information from said focus detection means.

6. An optical equipment according to claim 1, wherein said control means controls the drive of said first lens differently between the detection of the in-focus state by said focus detection means and the detection of the out-of-focus state by said focus detection means.

7. An optical equipment according to claim 6, wherein said control means inhibits said first lens from being driven out of said range when the in-focus state is detected by said focus detection means.

8. An optical equipment according to claim 6, wherein said control means determines whether said first lens is out of said range when the out-of-focus state is detected by said focus detection means, and forcibly drive said first lens into said range when said first lens is out of said range.

9. An optical equipment according to claim 7, wherein said control means determines whether said first lens is out of said range when the out-of-focus state is detected by said focus detection means, and forcibly drive said first lens into said range when said first lens is out of said range.

10. An optical equipment comprising:
   (a) a first lens for focusing and compensation for magnification variation;
   (b) a second lens for magnification variation;
   (c) position detection means for detecting positions of said first lens and said second lens;
   (d) lens drive means for driving said first lens and said second lens; and
   (e) control means for controlling said lens drive means in accordance with at least information from said position detection means;
   said control means determining a drive range of said first lens in accordance with focal length information and aperture number information and inhibiting said first lens from being driven out of said range during the magnification variation of said second lens.

* * * * *